United States Patent [19]
Nelligan

[11] 3,971,935
[45] July 27, 1976

[54] TWO DETECTOR PULSED NEUTRON POROSITY AND WATER SALINITY APPARATUS AND METHODS

[75] Inventor: William B. Nelligan, Danbury, Conn.

[73] Assignee: Schlumberger Technology Corporation, New York, N.Y.

[22] Filed: Nov. 4, 1974

[21] Appl. No.: 520,958

Related U.S. Application Data

[63] Continuation of Ser. No. 356,151, May 1, 1973, abandoned.

[52] U.S. Cl. ............................. 250/262; 250/266; 250/270
[51] Int. Cl.² ....................................... G01V 5/00
[58] Field of Search ............ 250/262, 264, 266, 270

[56] References Cited
UNITED STATES PATENTS

| | | | |
|---|---|---|---|
| 3,373,280 | 3/1968 | Mills | 250/262 |
| 3,462,600 | 8/1969 | Dewan | 250/261 |

*Primary Examiner*—Harold A. Dixon
*Attorney, Agent, or Firm*—Brumbaugh, Graves, Donohue & Raymond

[57] ABSTRACT

In the particular embodiments of the invention described, the formation surrounding a cased borehole is irradiated with bursts of high-energy neutrons and the resulting neutron population in the formation is observed at two spaced locations along the borehole. A neutron absorption characteristic of the formation is determined from the population measurement at one location, and a ratio of the population measurements at the two locations, suitably corrected for background radiation, is formed. Preferably, the neutron population measurements at both locations are made during measurement periods which are controlled as a function of the measured value of the neutron characteristic. Cross plots of the ratio and the neutron characteristic values thus derived afford apparent values of formation porosity and formation water salinity, from which water saturation values can be estimated.

52 Claims, 5 Drawing Figures

R-Σ CROSS PLOT FOR APPARENT POROSITY ($\phi_k$)

TWO DETECTOR PULSED NEUTRON POROSITY AND WATER SALINITY APPARATUS AND METHODS

This is a continuation of application Ser. No. 356,151, now abandoned.

BACKGROUND OF THE INVENTION

Field of the Invention

This invention relates generally to the investigation of subsurface earth formations by neutron logging techniques and, more particularly, to novel apparatus and methods for providing quantitative values of formation porosity and formation water salinity in cased borehole logging.

The Prior Art

Neutron logging tools and techniques have found wide acceptance in well logging, especially in the logging of cased boreholes where they afford marked advantages as compared to other logging systems. Prior through-casing logging tools have provided measurements of formation parameters, such as the macroscopic capture cross section ($\Sigma$) and the thermal neutron decay time ($\tau$), which are useful in recognizing the presence of hydrocarbons and in detecting changes in formation water saturation ($S_w$). Quantitative interpretation of water saturation with these prior tools, however, is possible only under favorable circumstances and where porosity ($\phi$) and water salinity (WS) information is known from previous open-hole investigations. But in many, if not most, instances, porosity and water salinity data are partly or wholly unavailable for cased boreholes, no open-hole logs having been run prior to production of the wells, so that water saturation interpretation in these instances can only be qualitative. Moreover, even when open-hole logging data are available, there is no assurance that the open-hole water salinity measurements are still valid for a producing well. In addition, measurements with the prior art tools sometimes require numerous time-consuming repeats which have to be recorded slowly due to the statistical nature of the measurements. Thus, a need has long existed for rapid, high quality equipment and procedures that will provide accurate quantitative values of formation porosity and water salinity by through-casing logging, thereby permitting useful interpretations of water saturation to be made in cased boreholes even when open-hole logs are non-existent or are no longer representative of present borehole conditions.

Various prior art procedures and apparatus have been proposed for providing porosity and water salinity information, both in cased and uncased holes. For instance, U.S. Pat. No. 3,373,280, issued Mar. 12, 1968, to W. R. Mills, Jr., U.S. Pat. No. 3,379,882, issued Apr. 23, 1968, to A. H. Youmans, U.S. Pat. No. 3,509,342, issued Apr. 28, 1970, to J. T. Dewan, and U.S. Pat. No. 3,621,255, issued Nov. 16, 1971, to R. J. Schwartz, all describe neutron logging systems for determining one or both of these factors. None of these systems, however, afford sufficiently reliable values of these parameters to allow quantitative determination of formation fluid conditions, absent open-hole logs, except in the most favorable circumstances.

SUMMARY OF THE INVENTION

It is therefore an object of the invention to provide improved through-casing neutron logging techniques and systems for deriving useful quantitative data of formation porosity and formation water salinity.

It is another object of the invention to provide such porosity and water salinity data by pulsed neutron logging apparatus and methods of improved construction and operation, and which simultaneously afford other valuable information concerning borehole conditions.

Still another object of the invention is to provide the aforementioned logging data in a rapid, yet reliable, manner.

The foregoing and other objects of the invention are attained, in accordance with the invention, by observing the neutron populations at two locations spaced along a formation to be investigated following or during irradiation of the formation with neutrons and, based on the observed neutron populations, deriving a first function which is dependent on the porosity and water salinity of the formation and a second function which is dependent upon neutron absorption properties of the formation. The two functions are then combined in a way to eliminate from the porosity and water salinity-dependent function the influence of neutron absorption on that function. Values are obtained, therefore, which are indicative of the apparent formation porosity and formation water salinity.

Further in accordance with the invention, a more accurate porosity and water salinity function is afforded by correcting the neutron population measurements at the two locations for background radiation at the respective locations prior to deriving the function. Preferably, this is a ratio function of the two background-corrected neutron population measurements. The neutron absorption characteristic of which the second function is formed preferably is the macroscopic capture cross section ($\Sigma$) of the formation. Accordingly, the neutron populations measured at the two locations suitably are the thermal neutron populations.

In a preferred embodiment of the invention, both the porosity and water salinity function and the absorption function are derived using a pulsed neutron source, although useful porosity and salinity functions may be obtained from steady state-source tools. With the preferred pulsed tool, neutron population measurements are made at both locations during measurement periods between successive neutron pulses. Each measurement period may comprise a first detection interval, in which the neutron population in the formation is measured. Where correction for background is to be made, as, for example, where gamma ray detectors are employed in making the neutron population measurements, a second detection interval in which background radiation is measured may be employed. The first and second interval measurements at each location are combined to provide a background-corrected measurement of the neutron population at that location. The detection intervals at the respective locations may be of equal or unequal durations, but a longer first interval at the more distantly spaced location is preferred for less statistical uncertainty.

According to another feature of the invention, the timing, i.e., either one but preferably both the time of occurrence and the duration, of each measurement period is controlled as a function of a measured value of the neutron absorption characteristic of which the aforementioned absorption function is derived. Hence, both the porosity and water salinity function and the absorption function are referenced in time to the preceding neutron pulse by a common factor. Combining of the two functions to obtain porosity and water salinity values is thereby facilitated.

BRIEF DESCRIPTION OF THE DRAWINGS

Further objects and advantages of the invention will be apparent from the following detailed description of exemplary embodiments thereof, taken in conjunction with the accompanying drawings, in which.

DESCRIPTION OF EXEMPLARY EMBODIMENTS

Figure 1:
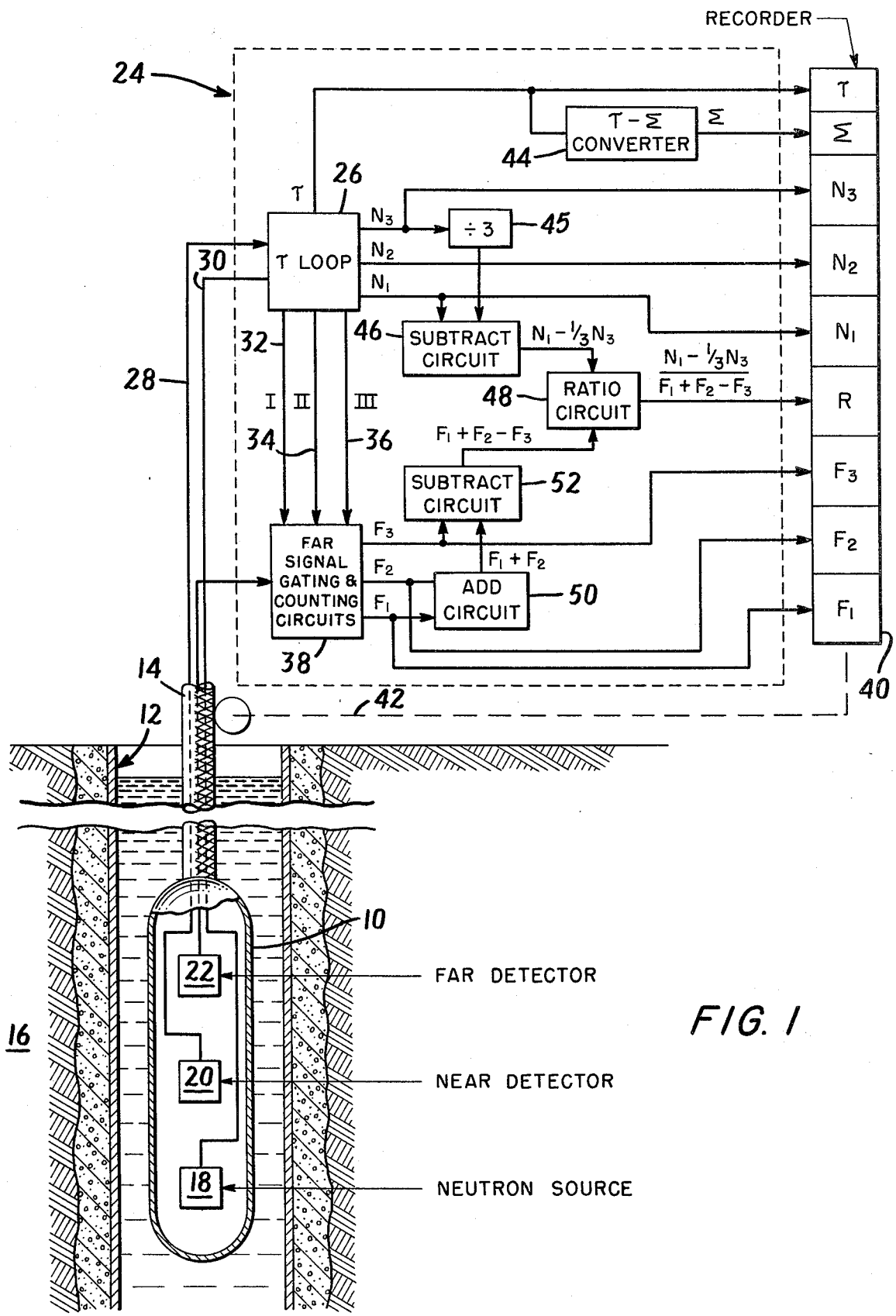
FIG. 1 is a schematic block diagram of an illustrative embodiment of the invention.

As depicted schematically in FIG. 1, a representative embodiment of neutron logging apparatus constructed in accordance with the invention includes a fluid-tight, pressure- and temperature-resistant tool 10 that is adapted to be suspended in a cased borehole 12 by an armored cable 14 for investigating a subsurface earth formation 16. Although no tubing is illustrated in the borehole, the tool preferably is sized, e.g., 1 11/16 inches diameter, for through-tubing use. The tool 10 includes a pulsed neutron source 18 and two spaced radiation detectors 20 and 22. The neutron source 18 is adapted to generate discrete pulses of high-energy neutrons (14 Mev), and suitably may be of the types described in more complete detail in U.S. Pat. No. 2,991,364, to Goodman, dated July 4, 1961, and U.S. Pat. No. 3,546,512, granted to Frentrop on Dec. 8, 1970, both commonly owned with this application. The radiation detectors 20 and 22 are positioned to respond in proportion to the density of thermal neutrons in the formation 16 and, to that end, may be of the thermal neutron-sensitive type, e.g., helium-3 filled proportional counters, or they may be gamma-ray detectors, embodying sodium iodide scintillation crystals, adapted to respond to gamma radiation resulting from the capture of thermal neutrons by nuclei of formation elements. For purposes of illustration herein, the detectors 20 and 22 are assumed to be sodium iodide-type gamma radiation detecting devices.

The detectors 20 and 22 are located on the same side of the neutron source 18 and preferably are positioned in the top portion of the tool 10 so that they will be vertically above the source 18 as the tool is drawn upward through the borehole. Advantageously, the short-spaced or "near" detector 20 is placed such that the geometric center of its scintillation crystal (not shown) is positioned approximately 13½ inches from the target (not shown) of the neutron source 18. The scintillation crystal may be on the order of 4 inches in length and is optically coupled in conventional fashion to a photomultiplier tube. The geometric center of the scintillation crystal of the long-spaced or "far" detector 22 may be located approximately 25 inches from the neutron source target. It too is optically coupled to a photomultiplier tube. Due to its greater spacing from the source 18, the far detector crystal preferably is more sensitive than the near detector crystal, and may be on the order of 6 inches in length. Although not shown, it will be understood that the tool 10 includes appropriate amplification and discrimination circuitry for eliminating noise and other electrical signals that are unrelated to the nuclear processes under observation and for amplification and transmission of the radiation-related signals to the signal processing circuitry. Also, other tools, such as a casing collar indicator tool and a gamma ray tool, may be incorporated in the tool 10 and run simultaneously therewith.

The processing circuitry may be located at the surface or partly at the surface and partly in the well tool. For simplicity and clarity of illustration, this circuitry 24 is shown at the surface in FIG. 1. The downhole circuitry of the FIG. 1 embodiment may then take the construction described in U.S. Pat. No. 3,609,366, dated Sept. 28, 1971, to Schwartz, and assigned to the assignee of the present application, though that patent shows amplification, discrimination and transmission circuitry for only one radiation detector. Suitable circuits could of course be readily provided for the second detector. The circuitry of U.S. Pat. No. 3,566,116 to Nelligan, dated Feb. 23, 1971, coassigned with the present application, could also be used.

The illustrative signal processing circuitry 24 represented in FIG. 1 includes a signal processing loop 26 which is coupled by a conductor 28 to the near detector 20 and by a conductor 30 to the neutron source 18. The loop 26 functions to derive a measurement of a neutron absorption characteristic, preferably $\tau$, of the formation 16 from neutron density, or population, measurements made at the near detector 20 and subsequently to control the operation of the source 18 and the gating of the detectors 20 and 22 as a function of the measured value of the neutron characteristic. It may take any construction appropriate to the performance of those functions. For example, the loop circuitry of the aforementioned Schwartz U.S. Pat. No. 3,609,366 or Nelligan U.S. Pat. No. 3,566,116 may be utilized.

Briefly, the $\tau$ loop 26 solves for a value of $\tau$ by measuring the rate of decay (absorption) of thermal neutrons in the formation opposite the location of the near detector 20. According to a preferred measurement sequence, successive neutron pulses, of one decay time ($\tau$) duration, are spaced from each other by intervals of 10 decay times (10$\tau$) in length. The neutron population is sampled, i.e., the number of individual gamma ray events registered in the near detector 20 is counted, during a measurement period encompassing three separate time intervals, or gates, between neutron pulses. A first population count rate (N$_1$) is taken during an interval I one decay time ($\tau$) long that begins two decay times (2$\tau$) after the preceding neutron pulse has terminated. The second time interval II, during which a second neutron population count rate (N$_2$) is taken, begins immediately after the first interval and is two decay times (2$\tau$) in length. When gamma radiation detectors are utilized, background gamma radiation is measured during the third detection interval III, and this background count rate preferably is made during an interval three decay times ($3\tau$) in length that is initiated six decay times ($6\tau$) after the end of the preceding neutron pulse. The next neutron pulse follows immediately after the end of the third detection interval.

In broad terms, the background count rate ($N_3$) is subtracted proportionately from the first interval count rate $N_1$ and the second interval count rate $N_2$ to provide a measure of the accumulated count rates, $N_1$ (net) and $N_2$ (net), respectively, during the first and second time intervals due to the neutron population only. The ratio $N_1$ (net)/$N_2$ (net) is then formed and the durations and delay after each neutron pulse of the first and second detection intervals are adjusted in a one-to-two ratio until the count rate ratio $N_1$ (net)/$N_2$ (net) equals 2.0. When this ratio is equal to 2.0, a condition of equilibrium is achieved and the thermal neutron decay time ($\tau$) is equal to the duration (T) of the first detection interval. Departures from this equilibrium condition result in a loop action that corrects the first gate width until equilibrium is restored to the system.

As mentioned, the operation of the neutron source 18 is also controlled as a function of a measured value of $\tau$. That is to say, both the duration of the individual neutron pulses and the elapsed time between successive pulses are varied in proportion to $\tau$. Hence, in FIG. 1 output signals from the $\tau$ loop 26 are passed downhole on the conductor 30 so as to cause source 18 to emit neutron pulses that are a specified multiple of $\tau$, e.g., $1\tau$, in duration and at intervals of a specified multiple of $\tau$, e.g., $10\tau$. Together with controlling the timings of the measurement periods, this method of regulating the source 18 results in high efficiency use of the source output, which in turn affords higher recording speeds and better quality logs.

Though improved results are obtained with $\tau$-controlled neutron pulses and repetition rates, this is not essential to the invention, and fixed duration pulses occurring at fixed intervals may be employed instead. Also, the $\tau$ loop 26 could be operated off of the far detector 22 if desired, though the neutron populations there have somewhat greater statistical variations than at the near detector.

The above-described detector gating program established by the $\tau$ loop 26 is also applied to the far detector 22, as indicated in FIG. 1 by conductors 32, 34 and 36 over which gating signals corresponding to the three detection intervals I, II and III, respectively, are transmitted to far detector signal gating and counting circuitry 38. Hence, the near and far detectors are simultaneously interrogated over detection intervals of equal duration.

It is to be noted at this juncture that, while the $\tau$ loop 26 is portrayed in FIG. 1 as being at the surface, it may be, and preferably is, located in the logging tool 10, along with the circuitry 38 for applying the detection intervals, or gates, to the far detector, as described, for example, in the commonly owned, copending application Ser. No. 356,150, filed May 1, 1973, of C. W. Johnstone entitled "Neutron Logging Reliability Techniques and Apparatus". A logging tool of this construction is also described in U.S. Pat. No. 3,662,179, issued May 9, 1972, to Frentrop et al. This patent is also held by the assignee of the present application. With the Frentrop et al. design, and multiconductor cable 14 utilized with the signal transmitting system of FIG. 1 is replaced by a monocable. Power and control information are transmitted downhole over the monocable, and the signals representative of the measured quantity, in this case $\tau$, are transmitted over the monocable to the surface for recording and further processing. Also sent uphole are the gated counting rates from the near and far detectors. To that end, the single-detector system of Frentrop et al. may be modified to include gating and transmitting circuits for the far detector signals, or a time division multiplex system may be used in place of the Frentrop et al. transmission circuitry.

Returning now to FIG. 1, the loop 26 also outputs signals representative of the loop value of $\tau$ and the average count rates $N_1$, $N_2$ and $N_3$ for the three detection intervals, and these signals are applied to separate channels of a recorder 40 in conventional fashion. The loop 26 also outputs on conductors 32, 34 and 36 the gating signals which were used in the $\tau$ computation circuitry to set the time intervals for the gates which produced $N_1$, $N_2$ and $N_3$. The recorder 40 conveniently may include both tape recording apparatus and visual recording apparatus for producing the customary record of logging signals as a function of tool depth. The usual cable-following mechanical linkage, indicated diagrammatically at 42 in FIG. 1, is provided for this purpose.

As $\tau$ and $\Sigma$ are reciprocally relaed ($\tau = 4.55/\Sigma$, where $\tau$ is in microseconds and $\Sigma$ is in cm$^{-1}$), a measurement of $\Sigma$ may readily be obtained from the $\tau$ signal from loop 26 simply by processing the $\tau$ signal through a suitable converter circuit 44. The output from the converter circuit 44 may then be applied to the recorder 40 to provide a depth record of $\Sigma$.

The far detector signals passed during the detection intervals I, II and III, may be counted in any conventional manner, e.g., in either digital or analog modes, by the circuitry 38. If an analog counting mode is employed, the counting components of circuitry 38 would include a separate analog count rate circuit for counting the signals passed during each of the three detection intervals I, II and III. These circuits preferably would have a long discharge time constant relative to the elapsed time between successive neutron pulses. For the digital mode, the circuitry 38 would include the functions of counting, storing and binary-to-analog conversion. Appropriate circuits for this purpose are described in the aforementioned Schwartz patent, U.S. Pat. No. 3,609,366, and need only be modified to include suitable circuitry for resetting the digital counters to zero after completion of each counting sequence. To that end, a signal coincident with the termination of gate III could be used to command the counter circuits to transfer the respective total counts to buffer registers and, after a suitable delay provided by a delay circuit to allow the foregoing transfer to be accomplished, to reset the counters to zero. The outputs of the binary-to-analog converter circuits would thus be analog voltages which are proportional to the total counts $F_1$, $F_2$ and $F_3$. If desired, suitable filters could be included in the output circuits of the binary-to-analog converters to filter out switching transients from the output signals.

The average thermal neutron population count rates $F_1$, $F_2$ and $F_3$ developed by the circuitry 38 are sent to the recorder 40. Although all of the count rate data ($N_1$, $N_2$, $N_3$, $F_1$, $F_2$ and $F_3$) generated by the tool preferably are recorded on magnetic tape in the recorder 40, not all of such data need be represented visually. A capability may be incorporated into the logging system, therefore, for the log operator to select the particular data which he wants displayed, and appropriate switches (not shown) may be provided to that end.

In accordance with the invention, a comparison of the near and far detector neutron population signals provides an indication of formation porosity. Inasmuch as the neutron populations at the two detector locations are also influenced by the absorptive properties of the formation fluid, and to some extent by the absorptive characteristics of the casing fluid as well, such comparison of the neutron population signals may also provide information as to the salinity, or more precisely the "salinity equivalency", of the formation fluid. Commonly, the formation fluid is water, so that it is usual to refer to neutron absorption in the formation fluid in terms of water salinity (WS). Although useful porosity and water salinity information may be obtained by comparing the gross counting rate measurements from the near and far detectors, erroneous determinations of those parameters might result when gamma-sensitive detectors are employed unless correction of the counting rates for background radiation is made. In this context, background radiation may be considered to include activation radiation, naturally occurring gamma radiation from the borehole environment, and other gamma radiation which may be present in the borehole, such as, for example, radiation emanating from radioactive salts which may accumulate on the tubing or casing during production of a well.

A suitable comparison of the near and far detector signals, therefore, may be made by forming the ratio of the net counting rates, i.e., the background-corrected counting rates, at the two detectors. With the foregoing detector gating program, this ratio may generally be expressed as follows:

$$\frac{N_1 - \frac{1}{3} N_3}{F_1 - \frac{1}{3} F_3} \quad (1)$$

In the foregoing expression, it is assumed that the detection interval at both detectors during which the neutron population measurement is made is of the same duration, namely, $1\tau$, and that the background detection interval is $3\tau$ in length. Because of the lower counting rate at the far detector 22, however, it is preferable, for greater statistical accuracy, that the neutron population counting rate at the far detector be averaged over a longer interval. Accordingly, the preferred ratio formed of the near and far neutron population measurements is the following:

$$R = \frac{N_1 - \frac{1}{3} N_3}{F_1 + F_2 - F_3} \quad (2)$$

In this expression, the time interval during which the neutron population is measured at the far detector is three times as long, i.e., $3\tau$, as the duration of the neutron population measurement interval at the near detector 20. Measurement intervals of other durations may of course be employed.

The signal processing circuitry 24 of the embodiment of FIG. 1 thus includes suitable components for solving expression (2) for a value of R, based on the signals generated by the near detector 20 and the far detector 22. The output signal from the $\tau$ loop 26 representative of the counting rate $N_3$ is applied to a divide-by-three circuit 45, and a signal corresponding to $\frac{1}{3} N_3$ is applied as one input to a subtract circuit 46. The other input to the subtract circuit is the $N_1$ output signal from the $\tau$ loop 26. The output of the subtract circuit 46 is therefore equal to the numerator of expression (2), namely, $N_1 - \frac{1}{3} N_3$, and this signal then becomes one input to a ratio circuit 48. The denominator of expression (2) is formed by inputting the $F_1$ and $F_2$ count rate signals from the far detector signal gating and counting circuits 38 to an add circuit 50, thereby summing the $F_1$ and $F_2$ count rates, and thereafter subtracting the $F_3$ counting rate signal from the output signal to the add circuit 50 in a subtract circuit 52. The output from the subtract circuit 52, representing the algebraic sum of $F_1 + F_2 - F_3$, is thereafter applied as the second input to the ratio circuit 48. The value of the ratio R thus derived is recorded in the recorder 40.

If desired, the ratio R could be derived using a pulsed neutron source and fixed measurement intervals, i.e., where the timings of the detection intervals are not adjusted during logging. Alternatively, the ratio could be computed using a steady state-source tool, such as that described in U.S. Pat. No. 3,483,376, to S. Locke et al., dated Dec. 9, 1969. With a pulsed source-fixed gate tool, however, the ratio R will also vary with the time after the neutron pulse, so that different porosity and water salinity curves would be obtained at different measurement times. By deriving R from neutron population measurements made at a time after the neutron pulse that is controlled as a function of $\Sigma$, however, this time after neutron pulse variable is automatically accounted for in the present invention.

As previously indicated, the measured value of the ratio R is related to formation porosity and to the borehole water and formation water salinities. More specifically, the counting rates from the near and far detectors 20 and 22, and hence the ratio R of those counting rates, vary as a function of the neutron slowing down length $L_S$ and the thermal diffusion length $L_D$ of the formation. Both $L_S$ and $L_D$ are functions of the hydrogen concentration, and consequently the porosity, of the formation, but $L_D$ is also strongly influenced by neutron absorption in the formation media of practical interest, much more so than is $L_S$. The dependence of $L_D$ on the neutron absorption characteristics of a formation may be expressed as $L_D = \sqrt{D/\Sigma}$, where D is the thermal neutron diffusion coefficient. In general, D decreases with hydrogen concentration (porosity) while $\Sigma$ increases, so that $L_D$ decreases as the hydrogen concentration (porosity) increases. $\Sigma$, however, is also greatly influenced by absorbing elements in both the rock matrix and the formation fluid. By use of cross plots of the ratio R versus $\Sigma$, where R can be derived from either continuous or pulsed neutron source tools, the influence of neutron absorption on R can be effectively eliminated, resulting in an output which is predominantly determined by the hydrogen concentration and thus the porosity of the formation. But as R is a function of both $L_S$ and $L_D$, a value of the ratio alone is not sufficient to enable determination of specific values of porosity and formation water salinity. Cross plotting of the ratio R against $\Sigma$, however, allows specific apparent porosity values ($\phi_k$) to be obtained, and, for particular porosity values, affords actual apparent values ($WS_a$) of formation water salinity, as is explained more fully hereinafter in connection with the representative cross plots presented in FIGS. 2 and 3.

Although the measured value of R is also dependent upon the casing water salinity, separate cross plots for different casing water salinities are not normally required in practice because the variations of R and $\Sigma$ with casing water salinity over the range of formation water salinity, 0 to 100 Kppm, within which the R and $\Sigma$ data points for oil-bearing formations fall is comparatively small. It has been found that a single R-$\Sigma$ cross plot, for a casing fluid salinity of 100 Kppm, for example, can be used for all casing water salinities above about 40 Kppm, without introducing significant error in the R and $\Sigma$ data points. For lower casing fluid salinities, however, separate cross plots should be established. As the R-$\Sigma$ cross plots are constructed from measured data, no correction for diffusion is required.

Various perturbational effects, chiefly neutron diffusion in the borehole environment, influence the value of $\Sigma_{log}$, as measured, for instance, by the circuitry 24 of FIG. 1, so that $\Sigma_{log}$ may depart significantly from the intrinsic macroscopic capture cross section of the formation, $\Sigma_{int}$. In the commonly owned, copending application of C. W. Johnstone, Ser. No. 356,150, filed May 1, 1973, and entitled "Neutron Logging Reliability Techniques and Apparatus", there is described a system for ascertaining when $\Sigma_{log}$ requires correction for such effects and for providing a corrected value of $\Sigma$. Insofar as the measurement of $\Sigma$ is concerned, the Johnstone system is basically the same as the embodiment of FIG. 1 herein, and, if desired, the circuitry 24 of FIG. 1 may readily be modified in accordance with Johnstone's teachings to include $\Sigma$ verification and correction capabilities.

The measured values of R and $\Sigma$ obtained will of course depend on the specific borehole conditions, and separate R-$\Sigma$ cross plots directed to those conditions are required. Hence, a family of porosity and water salinity curves would be constructed in accordance with the invention, depending on the particular lithology of the earth formation logged, the source-detector spacings, and the casing and borehole diameters. The $\phi_k$ and $WS_a$ curves depicted in FIGS. 2 and 3 are typical of these families of porosity and water salinity curves.

Figure 2:
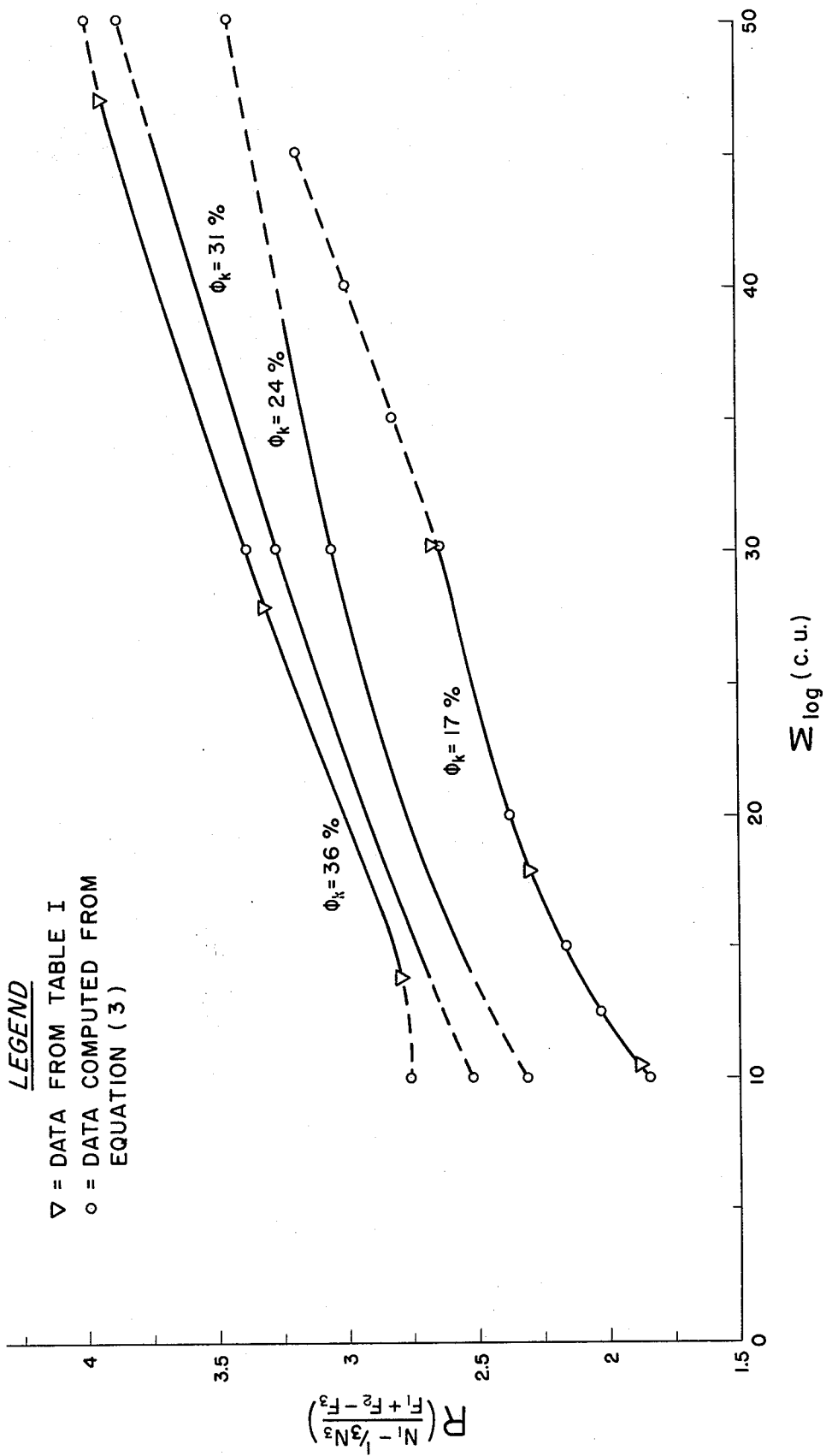
FIG. 2 is a typical cross plot of the ratio R versus $\Sigma_{meas}$ for the determination of porosity ($\phi_k$) in accordance with the invention.
Figure 3:
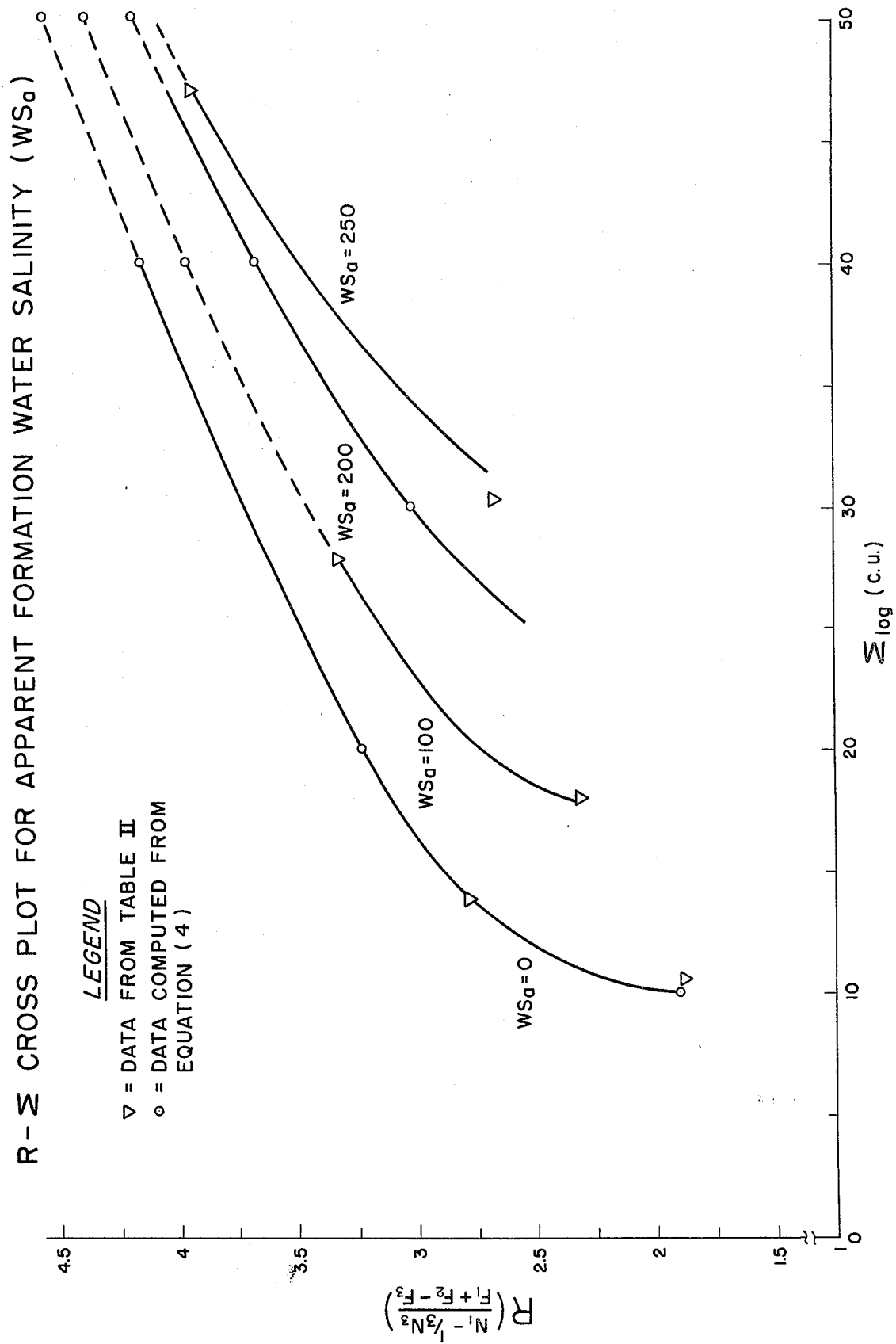
FIG. 3 is a representative R-$\Sigma_{meas}$ cross plot, according to the invention, for the determination of water salinity (WS$_a$)

Turning first to FIG. 2, the porosity curves there depicted are based upon experimental values of R and $\Sigma$ derived from data obtained in clean sand, with a 7 inch casing, a 10 inch borehole and a casing fluid salinity of 250 Kppm. These data were derived using a pulsed neutron tool, held against the casing wall, having a source-near detector spacing of 13 inches on centers and a near detector-far detector spacing of 11 ⅝ inches on centers. The source and detectors were gated in accordance with the aforementioned gating program. The experimental values are as follows:

TABLE I

| $\Phi = 0.17$ | | $\Phi = 0.36$ | |
|---|---|---|---|
| $\Sigma$(c.u.) | R | $\Sigma$(c.u.) | R |
| 10.5 | 1.88 | 13.9 | 2.79 |
| 17.9 | 2.30 | 27.8 | 3.31 |
| 30.2 | 2.67 | 47.0 | 3.94 | where 1 c.u. = $cm^{-1} \times 10^{-3}$.

Sands of known porosity were measured, and three sets of R and $\Sigma$ values were derived for each porosity by varying the neutron absorptive properties of the sand. In the experiments, this was done by changing the salinity of the fluid (water) occupying the pores of the sand. The cross plot of FIG. 2 was then constructed from the experimental R and $\Sigma$ data, indicated in FIG. 2 by the symbol ▽, giving two distinct porosity curves, one for the experimental data from the 17% porous sand and the other for the data from the 36% porous sand.

Employing conventional curve fitting techniques, a quadratic form of equation in the variables $\Sigma$ and R was determined to closely approximate the porosity curves obtained from the experimental values of R and $\Sigma$. Thus, the general form of equation relating R and $\Sigma$ to $\phi_k$, which is applicable for the entire family of porosity curves, may be written as follows:

$$\phi_k = a_1(\Sigma - k) + a_2(\Sigma - k)^2 + b_1(R - L) + b_2(R - L)^2 + c(\Sigma - k)(R - L) + d \qquad 3$$

By substituting the three sets of values of R and $\Sigma$ corresponding to each porosity in Table I, and taking $k=10$ and $L=1$ from FIG. 2, six simultaneous equations were obtained. The equations were then solved for the six coefficients $a_1$, $a_2$, $b_1$, $b_2$, $c$ and $d$ of equation (3). The specific values of the coefficients obtained for these data are: $a_1=1.893 \times 10^{-2}$, $a_2=5.338 \times 10^{-4}$, $b_1=-5.318 \times 10^{-1}$, $b_2=3.126 \times 10^{-1}$, $c=-2.394 \times 10^{-2}$, and $d=3.966 \times 10^{-1}$. The actual values of the coefficients would of course change for R and $\Sigma$ data obtained from different well conditions and different lithologies.

Using equation (3), and the values of the coefficients obtained by solution of the equation for the experimental data, values of R and $\Sigma$ were computed and plotted on FIG. 2, where they are indicated by the symbol o. The computed values for $\phi=17\%$ and $\phi=36\%$ may be seen to quite closely approximate the measured experimental values for those porosities. The intermediate porosity curves for $\phi=24\%$ and $\phi=31\%$ were then constructed based on computed data obtained from solutions of equation (3). The dotted portions of the porosity curves in FIG. 2 lie outside the regions of the experimental data and, accordingly, are considered to be extrapolations.

As the experimental values of R and $\Sigma$ listed in Table I were obtained by varying the absorptive properties of the experimental formation fluid by changing its salinity, those values were also applicable to establish water salinity curves, by means of the R-$\Sigma$ cross plot of FIG. 3.

Rearranged to reflect the formation water salinities corresponding to the respective sets of R and $\Sigma$ values, the data of Table I may be displayed in the following form:

TABLE II

| | | Water Salinity (Kppm) | | | | |
|---|---|---|---|---|---|---|
| | | (Nominally 0) | | (Nominally 100) | | (Nominally 250) |
| $\Phi$ | | 0 | 19.6 | 100 | 103 | 241 | 246 |
| 0.17 | $\Sigma$(c.u.) | 10.5 | | 17.9 | | 30.2 | |
| | R | 1.88 | | 2.30 | | 2.67 | |
| 0.36 | $\Sigma$(c.u.) | | 13.9 | | 27.5 | | 47.0 |
| | R | | 2.79 | | 3.31 | | 3.94 |

Data representative basically of three formation water salinity values, namely, 0 Kppm, 100 Kppm, and 250 Kppm, were measured. The R and $\Sigma$ values corresponding to the respective nominal water salinities were then cross plotted, as indicated by the symbol $\triangledown$ in FIG. 3, and the curves corresponding to the respective water salinities were developed.

Here again, the quadratic form of equation was found to closely approximate the experimental data, so that the general equation for obtaining apparent values of water salinity ($WS_a$) from measured values of R and $\Sigma$ may be written as follows:

$$WS_a = e_1(\Sigma-k) + e_2(\Sigma-k)^2 + f_1(R-L) + f_2(R-L)^2 + g(\Sigma-k)(R-L) + h \qquad 4.$$

Taking the known values of water salinity, R and $\Sigma$ from Table II, and from FIG. 3 again setting $k=10$ and $L=1$, six simultaneous equations were set up and solved for the values of the coefficients $e_1, e_2, f_1, f_2, g$ and $h$ of equation (4). The coefficient values obtained for these particular experimental data are: $e_1=3.585, e_2=4.115 \times 10^{-2}, f_1=4.280 \times 10^2, f_2=-1.708 \times 10^2, g=4.808$ and $h=-2.482 \times 10^2$. R-$\Sigma$ data points computed from equation (4) are plotted on FIG. 3, as indicated by the symbol $o$. The intermediate 200 Kppm curve was also developed by solution of equation (4). As before, the dotted portions of the water salinity curves are extrapolations of the curves beyond the region of experimental data.

Once having determined the appropriate coefficients of equations (3) and (4) for the particular borehole conditions of a logging run, apparent values of the formation porosity ($\phi_k$) and of the formation water salinity ($WS_a$) may quite readily be determined from the measured values of R and $\Sigma$ obtained during the logging run. Ordinarily, in practical field conditions the lithologies of the formations being investigated and the borehole and casing sizes are already known or can be ascertained quite readily. Hence, quantitative porosity and water salinity information may be derived, in accordance with the invention, without resort to open-hole logs. Where such logs are available, however, the present invention still affords valuable supplementary information as to current formation fluid conditions and may be used as a check on the validity of the open-hole logging information, particularly the formation water slainity data.

Equations (3) and (4), when solved using logged values of R and $\Sigma$, afford useful apparent values of formation porosity $\phi_k$ and formation water salinity $WS_a$. Reasonable corrections of the $\phi_k$ values thus derived for lithologies other than sand can be obtained by using the porosity equivalence charts which have been developed for steady state-source tools, such as are presented, for example, in the "Log Interpretation Charts" published in 1972 by Schlumberger Limited, Ridgefield, Connecticut. Alternatively, separate R-$\Sigma$ cross plots could be constructed for the lithologies of interest.

Although in smaller casings, e.g., a 5 ½ inch casing, the effect of standoff of the logging tool from the casing wall on measured values of R is negligible, the standoff effect becomes more significant as casing diameter increases and may be taken into account if greater accuracy in the measurement of R is desired. The degree of error in the measured value of R due to standoff effects may be readily ascertained by experiment. Laboratory tests indicate that R is not appreciably affected by the presence of tubing in the casing, although the tubing would necessarily result in an unknown amount of standoff, with a consequent effect on R, which would be more pronounced for larger casings than for smaller ones.

The foregoing computations of $\phi_k$ and $WS_a$ are preferably carried out automatically, either at the well site or remotely. Suitably, therefore, a data library is acquired over the commercially interesting range of mineral, borehole and casing size conditions, and is encoded in memory storage, or converted into an array of selectively actuatable function former circuits or is otherwise prepared in an appropriate form in order to provide the desired porosity and water salinity information. Ordinarily, the mineral, borehole and casing size data can be readily ascertained from standard logging sources, such as the "Driller's Log" or by relatively simple measurements. Where function former circuits are employed, the appropriate function former circuits may be selected manually for connection to the signal processing circuitry 24 for receipt of the R and $\Sigma$ signals.

Figure 4:
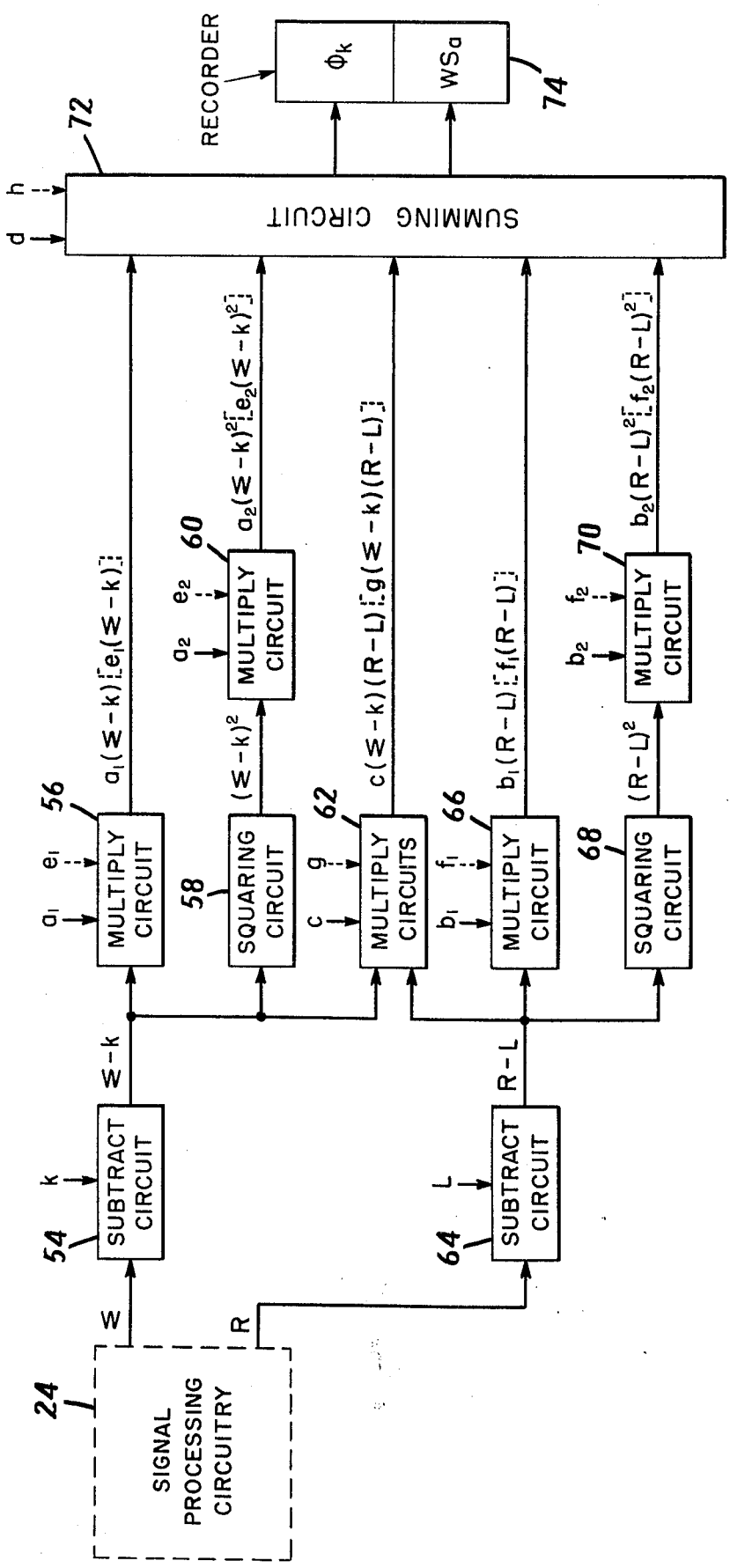
FIG. 4 is a schematic block diagram of circuitry for solving the porosity and water salinity curves of FIGS. 2 and 3 for values of $\phi_k$ and WS$_a$, respectively, corresponding to specific values of R and $\Sigma_{meas}$.

A general design of function former circuits for solving equations (3) and (4) for $\phi_k$ and $WS_a$, respectively, from measured values of R and $\Sigma$ is illustrated in FIG. 4. For brevity, the organization and operation of the circuit will be described with reference to the solution of equation (3) for $\phi_k$. However, it will be understood that the description is generally applicable to the solution of equation (4) as well, and this is indicated in FIG. 4 by the use of dashed lines to represent, where appropriate, the introduction of the constants ($e_1, e_2, f_1, f_2, g$ and $h$) and the computation of the various terms ($e_1(\Sigma-k)$, etc.) of that equation.

To obtain the apparent formation porosity $\phi_k$ corresponding to a pair of measured values of R and $\Sigma$, the $\Sigma$ output signal from the signal processing circuitry 24 of the embodiment of FIG. 1 is applied to a subtract circuit 54, along with an input signal that corresponds to the selected value of $k$. The subtract circuit 54 generates an output signal that reflects the term $\Sigma-k$. This signal is then combined in a multiply circuit 56 with a signal representative of the constant $a_1$ to provide a signal that reflects the term $a_1(\Sigma-k)$, which is the first term of equation (3). The $\Sigma$-$k$ signal is also sent to a squaring circuit 58, which generates an output signal corresponding to the quantity $(\Sigma-k)^2$ that is in turn combined in a multiply circuit 60 with a signal representative of the constant $a_2$ to generate a further signal representing the second term of equation (3), i.e., $a_2(\Sigma-k)^2$. Finally, the $\Sigma-k$ signal from subtract circuit 54 is inputted to multiply circuits 62, where it is combined with a signal corresponding to the constant $c$ and a signal from a subtract circuit 64 which corresponds to the quantity R-L. The R-L signal is generated by the subtract circuit 64 by subtracting from the R output signal from the circuitry 24 a signal indicative of the selected value of constant L.

Multiply circuits 62, therefore, generate a signal representative of the quantity $c(\Sigma-k)(R-L)$, the fifth term of equation (3). The R-L signal from subtract circuit 64 is also applied to a multiply circuit 66, where it is combined with a signal corresponding to the constant $b_1$ to generate an output signal indicative of the third term of equation (3), namely, $b_1(R-L)$. The R-L signal is additionally sent to a squaring circuit 68 to develop a signal representing the quantity $(R-L)^2$ which subsequently is combined with a $b_2$ signal in a multiply circuit 70 to produce an output signal representing the quantity $b_2(R-L)^2$, the fourth term of equation (3).

The output signals representing the five terms of equation (3), i.e., the signals from multiply circuits 56, 60, 62, 66 and 70, are all applied to a summing circuit 72 which combines the separate signals and a signal corresponding to the constant d from equation (3) to generate an output signal that reflects the value of $\phi_k$ corresponding to the measured values of R and $\Sigma$ from the circuitry 24. As indicated schematically in FIG. 4, the $\phi_k$ signal is sent to the recorder 74, as is the $WS_a$ signal derived through a solution of equation (4) by the introduction of the constants $e_1, e_2, f_1, f_2, g$ and $h$ into the appropriate multiply circuits of the FIG. 4 embodiment in place of the corresponding constants $a_1, a_2, b_1, b_2, c$ and $d$ of equation (3).

It will of course be understood that the foregoing constants will vary for each set of borehole conditions and for different lithologies. Consequently, multiposition switches (not shown) preferably are provided at the function former circuits input to enable the log operator to select the correct constants in accordance with known borehole data.

Figure 5:
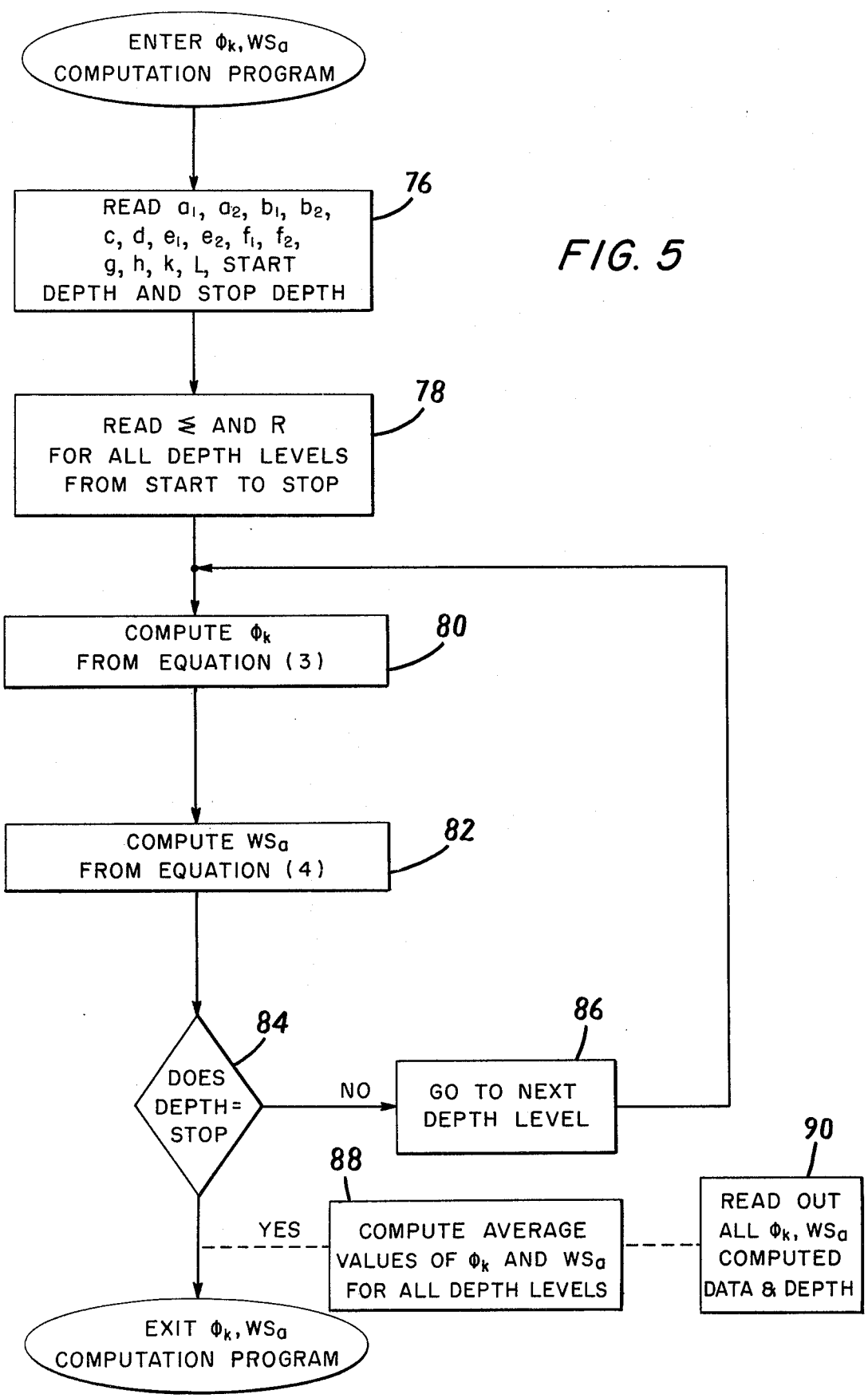
FIG. 5 illustrates another embodiment of practicing the invention by appropriately programming a general purpose digital computer.

Alternatively, the computations required for solutions of the porosity and water salinity equations, of which equations (3) and (4) are typical, may be carried out by appropriate programming of a general purpose digital computer, such as, for example, the EMR 6050 Computer manufactured by Electromechanical Research, Inc. FIG. 5 illustrates a generalized flow diagram which may be utilized for this purpose.

In FIG. 5, the first step, after entering the $\phi_k - WS_a$ computation program, is to enter the particular values of all constants called for by equations (3) and (4), as well as the start and stop depths of the investigation interval. Box 76 represents this step. Thereafter, the computer is instructed to read the values of R and $\Sigma$ measured at each depth level, e.g., every 6 inches, over the investigation interval, as represented by box 78. Once these initial data are entered, the computer is instructed (box 80) to compute $\phi_k$ from equation (3) for each depth level in the investigation interval beginning at the start depth. The program next instructs the computer to compute $WS_a$ from equation (4) for each depth level, as illustrated by box 82. Suitable sub-programs for carrying out the solutions of equations (3) and (4) are commercially available, e.g., from IBM Corporation.

After the computation of $\phi_k$ and $WS_a$ for each depth level, a test is made, as represented by the diamond-shaped box 84, to determine if that depth level is equal to the stop depth. If it is not, the program instructs the computer (box 86) to go to the next depth level and compute values of $\phi_k$ and $WS_a$ for that level. the computer thus calculates $\phi_k$ and $WS_a$ for all depth levels over the investigation interval.

When the final computation is completed, and the test of box 84 is passed, the computer may be instructed to average the individual values of $\phi_k$ and $WS_a$ over a suitable number of depth levels, e.g., three depth levels, to give more statistically representative values of $\phi_k$ and $WS_a$. This function is illustrated by box 88. Thereafter, the next step (box 90) may be to read out all $\phi_k$ and $WS_a$ computed data and the corresponding depth levels, including the individual and averaged values of those parameters. The read out may be in any suitable format, such as a playback tape or a tabulation.

The availability, in accordance with the invention, of quantitative values of formation porosity and water salinity in cased boreholes permits estimation of the apparent water saturation ($S_{wa}$) of formations located behind the casing. This capability is especially useful in the investigation of producing wells for which open-hole logs do not exist or are otherwise unavailable, which is frequently the case. Even where the required open-hole logs are available, however, the invention affords a technique for providing other measurements of the same parameters or for quick evaluation of a formation zone, e.g., as a reconnaissance technique. It is thus an important supplement to standard methods of log analysis, particularly when the formation porosity and the absorptive properties of the formation fluid are not well known.

An initial step in making water saturation estimations is to determine $\phi_k$ and $WS_a$ in the cleanest (non-shaly) water-bearing zones logged. This value of $WS_a$ is then taken as the maximum water salinity value, $WS_a$ (max). An $S_w$ of 100% is assumed for the cleanest water-bearing sands. As the measured values of $\Sigma$ for fresh water and for oil are nearly equal, oil will appear as fresh water. The apparent water saturation ($S_{wa}$) for a suspected oil-bearing zone, however, may be estimated by comparing the $WS_a$ value determined for that zone (by solution of equation (4), for example) with the $WS_a$(max) value previously determined, i.e., $S_{wa} \approx WS_a$(oil zone)/$WS_a$(max). This is assuming that the formation zone of interest is not gassy, but is filled with a fluid.

For gassy zones, a quick way to estimate $S_w$ is to compare $\phi_k$ in the gassy zone to what the true porosity of the formation is, if this is known, or to the value of $\phi_k$ previously determined for the cleanest water-bearing zone. Hence, an estimation of $S_{wa}$ in gas zones may be had from the relationship $S_{wa} \approx \phi_k$(gas sand)/$\phi_k$ (water sand).

The foregoing water saturation estimation technique is relatively independent of actual formation characteristics ($\Sigma_w, \Sigma_{ma}$ and $\phi$, where $\Sigma_w$ is the $\Sigma$ of the formation fluid, $\Sigma_{ma}$ is the $\Sigma$ of the matrix rock and $\phi$ is the true formation porosity), since $S_{wa}$ is obtained by means of ratios. Shaliness, on the other hand, has been found to have a disturbing effect on the accuracy of the $S_{wa}$ estimation. However, in many cases shaly water sands have about the same $WS_a$ as clean water sands, so that the $WS_a$(max) value determined by this method will be fairly reliable. But in shaly oil sands, $WS_a$, as measured, tends to be too large, with result that the estimated $S_{wa}$ is also too large.

Although the invention has been described with reference to specific embodiments thereof, many modifications and variations of such embodiments may be made by one skilled in the art without departing from the inventive concepts disclosed. Accordingly, all such modifications and variations are intended to be included within the spirit and scope of the appended claims.

I claim:

1. Apparatus for investigating a characteristic of an earth formation traversed by a borehole, comprising:
   neutron source means for irradiating the formation with a pulse of neutrons;
   first and second detector means spaced at different distances from the neutron source for generating signals in response to gamma radiation within the borehole following said neutron pulse;

first gating means for passing signals generated by the first detector means during (1) a first time interval following said neutral pulse in which the generated signals are representative of the neutron population in the formation opposite said first detector means and (2) a second time interval in which the generated signals are representative of background radiation at the first detector means;

second gating means for passing signals generated by the second detector means during (1) a first time interval in which the generated signals are representative of the neutron population in the formation opposite said second detector means and (2) a second time interval in which the generated signals are representative of background radiation at the second detector means;

means for combining the signals passed by the first gate means during the first and second time intervals thereof to provide a first background-corrected measurement of the neutron population in the formation;

means for combining the signals passed by the second gate means during the first and second time intervals thereof to provide a second background-corrected measurement of the neutron population in the formation; and means for forming a function of the first and second background-corrected neutron population measurements as an indication of at least one of the porosity of the formation and the salinity of the formation fluid.

2. The apparatus of claim 1 wherein said function of the first and second measurements is a ratio of said measurements.

3. The apparatus of claim 1 further comprising means for controlling the timing of at least the time intervals of said first and second gate means as a function of a neutron absorption characteristic of the formation.

4. The apparatus of claim 1 wherein the neutron population to which the signals passed during the first time intervals of said first and second gate means are representative is the thermal neutron population.

5. The apparatus of claim 1 wherein:
the neutron source means is operative successively to irridiate the formation with pulses of neutrons; and
said first and second gate means are operative to place the respective first and second time intervals between successive neutron pulses.

6. The apparatus of claim 5 further comprising means for controlling the timing of the first and second time intervals of said first and second gate means as a function of a neutron characteristic of the formation.

7. The apparatus of claim 1 wherein:
the first time interval of the second gate means is of longer duration than the first time interval of the first gate means; and
the means for combining the signals passed by the first gate means and the means for combining the signals passed by the second gate means are operative to subtract the signals passed during the respective second time intervals from the signals passed during the respective first time intervals in proportion to the duration of the respective first time intervals.

8. Apparatus for investigating a characteristic of earth formations traversed by a borehole, comprising:
a well tool adapted to be moved through the borehole;

first and second detector means positioned at first and second locations, respectively, on the well tool for, upon irradiation of a formation at a given depth in the borehole with neutrons from a point spaced along the well tool from said first and second locations by different distances, generatng signals representative of the magnitudes of at least the neutron populations in the formation at said locations;

means responsive to the generated signal from the first and second detector means for deriving a function of the comparative magnitudes of the neutron populations in the formation at said first and second locations;

means for deriving a function representative of a neutron absorption parameter of the formation at substantially said given depth in the borehole; and means for combining the neutron populations function and the neutron absorption function in accordance with a predetermined relationship, including (1) said absorption function and said neutron population function as independent variables and (2) constants representing the influence on said functions of borehole conditions, for providing an output representative of the formation porosity, said constants being determined by deriving said neutron populations function and said neutron absorption function for known values of porosity under substantially the same borehole conditions as those of the borehole to be investigated.

9. Apparatus for investigating a characteristic of an earth formation traversed by a borehole, comprising:
means for irradiating the formation with pulses of neutrons;

first and second detector means spaced at first and second locations from the irradiation means for generating signals representative of the magnitudes of at least the thermal neutron populations in the formation at said locations;

means responsive to the signals generated by at least one of the first and second detector means for deriving a function representative of a neutron absorption parameter of the formation;

means responsive during first and second measurement periods between neutron pulses to the signals generated by the first and second detector means, respectively, for deriving a function of the comparative magnitudes of the neutron populations in the formation at said first and second locations; and means for combining the absorption function and the neutron populations function in accordance with a predetermined relationship, including (1) said absorption function and said neutron population function as independent variables and (2) constants representing the influence on said functions of borehole conditions, for providing an output representative of the formation porosity, said constants being determined by deriving said neutron populations function and said neutron absorption function for known values of porosity under substantially the same borehole conditions as those of the borehole to be investigated.

10. A method for investigating a characteristic of an earth formation traversed by a borehole from detected indications of the neutron populations in a formation, comprising:
deriving first and second neutron population measurements from detected indications representative of the magnitudes of the neutron populations in the formation at first and second spaced-apart locations, respectively, along the borehole;

deriving a function from said first and second neutron population measurements which is representative of the comparative magnitudes of the respective neutron populations;

deriving a function representative of a neutron absorption parameter of the formation which is correlated in depth with said first and second neutron population measurement; and combining the neutron populations function and the absorption function in accordance with a predetermined relationship, including (1) said absorption function and said neutron population function as independent variables and (2) constants representing the influence on said functions of borehole conditions, for providing an output representative of the formation porosity, said constants being determined by deriving said neutron populations function and said neutron absorption function for known values of porosity under substantially the same borehole conditions as those of the borehole to be investigated.

11. A method for investigating a characteristic of an earth formation traversed by a borehole based upon successive detected indications of at least the thermal neutron populations in the formation at first and second locations spaced along the borehole following successive irradiations of the formation with pulses of neutrons, comprising:

deriving a function of the comparative magnitude of the neutron populations in the formation at said first and second locations from neutron population indications detected at said locations during first and second measurement periods, respectively, between neutron pulses;

deriving a function of a neutron absorption parameter of the formation from the detected indications from at least one of said first and second locations; and combining the neutron function and the absorption function in accordance with a predetermined relationship, including (1) said absorption function and said neutron population function as independent variables and (2) constants representing the influence on said functions of borehole conditions, for providing an output representative of the formation porosity, said constants being determined by deriving said neutron populations function and said neutron absorption function for known values of porosity under substantially the same borehole conditions as those of the borehole to be investigated.

12. Apparatus for investigating a characteristic of earth formations traversed by a borehole, comprising:

a well tool adapted to be moved through the borehole;

first and second detector means positioned at first and second locations, respectively, on the well tool for, upon irradiation of a formation at a given depth in the borehole with neutrons from a point spaced along the well tool from said first and second locations by diffent distances, generating signals representative of the magnitudes of at least the neutron populations in the formation at said locations;

means responsive to the generated signals from the first and second detector means for deriving a function of the comparative magnitudes of the neutron populations in the formation at said first and second locations;

means for deriving a function representative of a neutron absorption parameter of the formation at substantially said given depth in the borehole; and means for combining the neutron populations function and the neutron absorption functon in accordance with respective predetermined relationships, including (1) said neutron population function and said neutron absorption function as independent variables and (2) constants representing the influence on said functions of borehole conditions, to provide an output representative of at least one of the formation porosity and the formation fluid salinity, said constants being determined by deriving said neutron populations function and said neutron absorption function for known values of porosity and formation fluid salinity under substantially the same borehole conditions as those of the borehole to be investigated.

13. The apparatus of claim 12 wherein the neutron absorption parameter is a thermal neutron absorption parameter of the formation.

14. The apparatus of claim 13 wherein:

said neutron populations function deriving means comprises means for measuring the magnitudes of the thermal neutron populations in the formation at said first and second locations and means for forming a ratio of the first and second neutron population measurements; and the neutron absorption function driving means comprises means for measuring the macroscopic cross section of the formation for absorption of thermal neutrons.

15. Apparatus for investigating a characteristic of earth formation traversed by a borehole, comprising:

a well tool adapted to be moved through the borehole;

first and second gamma radiation detector means positioned at first and second locations, respectively, on the well tool for, upon irradiation of a formation at a given depth in the borehole with neutrons from a point spaced along the well tool from said first and second locations by different distances, generating signals representative of the magnitudes of at least the thermal neutron populations in the formation at said locations:

means responsive to the generated signals from the first and second detector means for deriving background-corrected measurements of the thermal neutron populations in the formation at said first and second locations and for forming a ratio of the first and second background-corrected neutron population measurements;

means for measuring the macroscopic cross section of the formation for absorption of thermal neutrons; and means for combining a representation of the ratio and a representation of the macroscopic absorption cross section measurement in accordance with respective predetermined relationships to provide an output representative of at least one of the formation porosity and the formation fluid salinity, said relationships being determined by deriving said neutron populations ratio and said macroscopic absorption cross section measurement for known values of porosity and formation fluid salinity under substantially the same borehole conditions as those of the borehole to be investigated.

16. Apparatus for investigating a characteristic of earth formations traversed by a borehole, comprising:
a well tool adapted to be moved through the borehole;
first and second gamma radiation detector means positioned at first and second locations, respectively, on the well tool for, upon irradiation of a formation at a given depth in the borehole with neutrons from a point spaced along the well tool from said first and second locations by different distances, generating signals representative of the magnitudes of at least the thermal neutron populations in the formation at said locations;
means responsive to the generated signals from the first and second detector means for deriving background-corrected measurements of the magnitudes of the neutron populations in the formation at said first and second locations and for deriving a function of the comparative magnitudes of the first and second location background-corrected measurements;
means for deriving a function representative of a neutron absorption parameter of the formation at substantially said given depth in the borehole; and
means for combining the neutron populations function and the neutron absorption function in accordance with respective predetermined relationships to provide an output representative of at least one of the formation porosity and the formation fluid salinity, said relationships being determined by deriving said neutron populations function and said neutron absorption function for known values of porosity and formation fliuid salinity under substantially the same borehole conditions as those of the borehole to be investigated.

17. Apparatus for investigating a characteristic of an earth formation traversed by a borehole, comprising:
means for irradiating the formation with pulses of neutrons;
first and second detector means spaced at first and second locations from the irradiation means for generating signals representative of the magnitudes of at least the thermal neutron populations in the formation at said locations;
means responsive to the signals generated by at least one of the first and second detector means for deriving a function representative of a neutron absorption parameter of the formation;
means responsive during first and second measurement periods between neutron pulses to the signals generated by the first and second detector means, respectively, for deriving a function of the comparative magnitudes of the neutron populations in the formation at said first and second locations; and
means for combining the absorption function and the neutron populations function in accordance with respective predetermined relationships, including (1) said absorption function and said neutron populations function as independent variables and (2) constants representing the influence on said functions of borehole conditions, to provide an output representative of at least one of the formation porosity and the formation fluid salinity, said constants being determined by deriving said neutron populations function and said neutron absorption function for known values of porosity and formation fluid salinity under substantially the same borehole conditions as those of the borehole to be investigated.

18. The apparatus of claim 17 wherein said neutron populations function deriving means comprises means for measuring the magnitudes of the thermal neutron populations in the formation at said first and second locations during said first and second measurement periods, respectively, and means for forming a ratio of the first and second thermal neutron population measurements.

19. The apparatus of claim 18 wherein the neutron absorption function deriving means comprises means for measuring the macroscopic cross section of the formation for absorption of thermal neutrons.

20. Apparatus for investigating a characteristic of an earth formation traversed by a borehole, comprising:
means for irradiating the formation with pulses of neutrons;
first and second detector means spaced at first and second locations from the irradiation means for generating signals representative of the magnitudes of at least the thermal neutron populations in the formation at said locations;
means responsive to the signals generated by at least one of the first and second detector means for deriving a function representative of a neutron absorption parameter of the formation;
means responsive during first and second measurement periods between neutron pulses to the signals generated by the first and second detector means, respectively, for deriving a function of the comparative magnitudes of the neutron populations in the formation at said first and second locations, said neutron populations function deriving means comprising means for measuring the magnitudes of the thermal neutron populations in the formation at said first and second locations during said first and second measurement periods, respectively, and means for forming a ratio of the thermal neutron population measurements at the first and second locations; and
means for combining the absorption function and the neutron populations function in accordance with respective predetermined relationships to provide an output representative of at least one of the formation porosity and the formation fluid salinity, said relationships being determined by driving said neutron populations function and said neutron absorption function for known values of porosity and formation fluid salinity under substantially the same borehole conditions as those of the borehole to be investigated.

21. Apparatus for investigating a characteristic of an earth formation traversed by a borehole, comprising:
means for irradiating the formation with pulses of neutrons;
first and second gamma radiation detector means for generating signals in response to gamma radiation within the borehole, said detector means being spaced at first and second locations from the irradiation means and generating signals representative of the magnitudes of at least the thermal neutron populations in the formation at said locations;
means responsive to the signals generated by at least one of the first and second detector means for deriving a function representative of the macroscopic cross section of the formation for absorption of thermal neutrons;

means responsive during first and second measurement periods between neutron pulses to the signals generated by the first and second detector means, respectively, for making first and second background-corrected measurements of the magnitudes of the respective thermal neutron populations at said first and second locations and for deriving a function of the comparative magnitudes of said first and second background-corrected measurements; and means for combining the macroscopic cross section function and the neutron populations function in accordance with respective predetermined relationships to provide an output representative of at least one of the formation porosity and the formation fluid salinity.

22. The apparatus of claim 21 wherein said ratio forming means is operative to form a ratio of said first and second background-corrected measurements.

23. The apparatus of claim 22 wherein said background-corrected measuring means comprises:

first gate means for passing signals generated by the first detector means during (1) a first time interval within said first measurement period in which the generated signals are representative of the neutron population in the formation at said first location and (2) a second time interval within said first measurement period in which the generated signals are representative of background radiation at the first location;

second gate means for passing signals generated by the second detector means during (1) a first time interval within said second measurement period in which the generated signals are representative of the neutron population in the formation at said second location and (2) a second time interval within said second measurement period in which the generated signals are representative of background radiation at the second location;

means for combining the signals passed by the first gate means during the first and second time intervals thereof to provide a first background-corrected measurement of the magnitudes of the neutron population in the formation; and means for combining the signals passed by the second gate means during the first and second time intervals thereof to provide a second background-corrected measurement of the magnitudes of the neutron population in the formation.

24. The apparatus of claim 23 wherein the absorption function deriving means further comprises means for controlling the timings of at least the first time intervals of the first and second measurement periods as a function of said neutron absorption parameter.

25. The apparatus of claim 24 wherein the absorption function deriving means further comprises means for controlling the timings of said first and second measurement periods as a function of said neutron absorption parameter.

26. The apparatus of claim 25 wherein said neutron absorption parameter is the macroscopic cross section of the formation for capture of thermal neutrons.

27. A method for investigating a characteristic of an earth formation traversed by a borehole from detected indications of the neutron populations in a formation, comprising:

deriving first and second neutron population measurements from detected indications representative of the magnitudes of the neutron populations in the formation at first and second spaced-apart locations, respectively, along the borehole;

deriving a function from said first and second neutron population measurements which is representative of the comparative magnitudes of the respective neutron populations;

deriving a function representative of a neutron absorption parameter of the formation which is correlated in depth with said first and second neutron population measurements; and combining the neutron populations function and the absorption function in accordance with respective predetermined relationships including (1) said neutron population function and said absorption function as independent variables and (2) constants representing the influence on said functions of borehole conditions, to provide an output representative of at least one of the formation porosity and the formation fluid salinity, said constants being determined by deriving said neutron populations function and said neutron absorption function for known values of porosity and formation fluid salinity under substantially the same borehole conditions as those of the borehole to be investigated.

28. The method of claim 27 wherein:

the step of deriving first and second neutron populations measurements comprises deriving first and second measurements of the magnitudes of the thermal neutron populations in the formation at the first and second locations, respectively; and the step of deriving a function representative of a neutron absorption parameter of the formation comprises deriving a function representative of a thermal neutron absorption parameter of the formation.

29. The method of claim 28 wherein the neutron populations function deriving step comprises forming a ratio of the first and second thermal neutron population measurements.

30. The method of claim 29 wherein the neutron absorption function deriving step comprises measuring the macroscopic cross section of the formation for capture of thermal neutrons.

31. A method for investigating a characteristic of an earth formation traversed by a borehole from detected gamma radiation within the borehole related to thermal neutron populations in the formation, comprising the steps of:

deriving first and second background-corrected measurements of the magnitudes of the thermal neutron populations in the formation at first and second spaced-apart locations, respectively, along the borehole;

forming a ratio of the first and second background-corrected thermal neutron population measurements;

measuring the macroscopic cross section of the formation for absorption of thermal neutrons, said cross section measurement being correlated in depth with said first and second thermal neutron population measurements; and combining a representation of the ratio measurement and a representation of the macroscopic absorption cross section measurement in accordance with respective predetermined relationships to provide an output representative of at least one of the formation porosity and the formation fluid salinity, said relationships being determined by deriving said ratio and said macroscopic absorption cross section measurement for known values of porosity and formation fluid salinity under substantially the same borehole conditions as those of the borehole to be investigated.

32. A method for investigating a characteristic of an earth formation traversed by a borehole from detected gamma radiation within the borehole related to neutron populations in the formation, comprising the steps of:
   deriving first and second background-corrected neutron population measurements of the magnitudes of the neutron populations in the formation at first and second spaced-apart locations, respectively, along the borehole;
   deriving a function representative of the comparative magnitudes of the first and second background-corrected neutron population measurements;
   deriving a function representative of a neutron absorption parameter of the formation which is correlated in depth with said first and second neutron population measurements; and
   combining the neutron populations function and the absorption function in accordance with respective predetermined relationships to provide an output representative of at least one of the formation porosity and the formation fluid salinity, said relationships being determined by deriving said neutron populations function and said neutron absorption function for known values of porosity and formation fluid salinity under substantially the same borehole conditions as those of the borehole to be investigated.

33. The method of claim 32 wherein the neutron absorption parameter is the macroscopic cross section of the formation for capture of thermal neutrons.

34. A method for investigating a characteristic of an earth formation traversed by a borehole based upon successive detected indications of at least the thermal neutron populations in the formation at first and second locations spaced along the borehole following successive irradiations of the formation with pulses of neutrons, comprising:
   deriving a function of the comparative magnitudes of the neutron populations in the formation at said first and second locations from neutron population indications detected at said locations during first and second measurement periods, respectively, between neutron pulses;
   deriving a function of a neutron absorption parameter of the formation from the detected indications from at least one of said first and second locations; and
   combining the neutron populations function and the absorption function in accordance with respective predetermined relationships, including (1) said neutron population function and said absorption function as independent variables and (2) constants representing the influence on said functions of borehole conditions, to provide an output representative of at least one of the formation porosity and the formation fluid salinity, said constants being determined by deriving said neutron populations function and said neutron absorption function for known values of porosity and formation fluid salinity under substantially the same borehole conditions as those of the borehole to be investigated.

35. The method of claim 34 wherein the neutron absorption function deriving step comprises:
   deriving a measurement of a neutron absorption parameter of the formation from the detected indications from at least one of said first and second locations; and
   controlling the timing of the first and second measurement periods as a function of said measured neutron absorption parameter.

36. The method of claim 35 wherein said neutron absorption parameter is the macroscopic cross section of the formation for capture of thermal neutrons.

37. The method of claim 34 wherein the neutron populations function deriving step comprises measuring the magnitudes of the neutron populations in the formation at said first and second locations during said first and second measurement periods, respectively, said neutron populations function being a function of a ratio of said first and second measurements.

38. The method of claim 34 wherein:
   the neutron populations function is representative of the thermal neutron population magnitudes in the formation at said first and second locations; and
   the neutron absorption function is representative of a thermal neutron absorption parameter of the formation.

39. The method of claim 38 wherein the neutron populations function deriving step comprises deriving a function related to a ratio of the thermal neutron population magnitudes in the formation at said first and second locations from thermal neutron population indications detected at said locations.

40. The method of claim 39 wherein the neutron absorption function deriving step comprises deriving a measurement of the macroscopic cross section of the formation for capture of thermal neutrons.

41. The method of claim 38 wherein said relationships are determined by deriving said neutron populations function and said neutron absorption function for known values of porosity and formation fluid salinity under substantially the same borehole conditions as those of the borehole to be investigated.

42. A method for investigating a characteristic of an earth formation traversed by a borehole based upon the successive detection of gamma radiation within the borehole representative of at least the thermal neutron populations in the formation at first and second locations spaced along the borehole following successive irradiations of the formation with pulses of neutrons, comprising the steps of:
   making background-corrected measurements of the magnitudes of the neutron populations at said first and second locations from gamma radiation detected at said locations during first and second measurement periods, respectively;
   deriving a function of the comparative magnitudes of the background-corrected neutron population measurements;
   deriving a function of a neutron absorption parameter of the formation from the detected gamma radiation from at least one of said first and second locations; and
   combining the neutron populations function and the absorption function in accordance with respective predetermined relationships to provide an output representative of at least one of the formation porosity and the formation fluid salinity.

43. The method of claim 42 wherein the step of making background-corrected measurements comprises:
passing detected indications from the first location during (1) a first time interval within said first measurement period in which the detected indications are representative of the neutron population in the formation at said first location and (2) a second time interval within said first measurement period in which the detected indications are representative of background radiation at the first location;
passing detected indications from the second location during (1) a first time interval within said second measurement period in which the detected indications are representative of the neutron population in the formation at said second location and (2) a second time interval within said second measurement period in which the detected indications are representative of background radiation at the second location;
combining the detected indications passed during the first and second time intervals in the first measurement period to provide a first background-corrected measurement of the neutron population in the formation; and
combining the detected indications passed during the first and second time intervals in the second measurement period to provide a second background-corrected measurement of the neutron population in the formation.

44. The method of claim 43 wherein the neutron absorption function deriving step comprises:
deriving a measurement of a thermal neutron absorption parameter of the formation; and
controlling the timings of at least the first time intervals of the first and second measurement periods as a function of said measured neutron absorption parameter.

45. Apparatus for investigating a characteristic of earth formations traversed by a borehole, comprising:
a well tool adapted to be moved through the borehole;
first and second detector means positioned at first and second locations, respectively, on the well tool for, upon irradiation of a formation at a given depth in the borehole with neutrons from a point spaced along the well tool from said first and second locations by different distances, generating signals representative of the magnitudes of at least the neutron populations in the formation at said locations;
means responsive to the generated signals from the first and second detector means for deriving a function of the comparative magnitudes of the neutron populations in the formation at said first and second locations;
means for deriving a function representative of a neutron absorption parameter of the formation at substantially said given depth in the borehole; and
means for combining the neutron populations function and the neutron absorption function in accordance with a predetermined relationship for providing an output representative essentially of the formation porosity.

46. The apparatus of claim 45 wherein:
the means for deriving a function of the comparative neutron population magnitudes comprises means for measuring the magnitudes of the neutron populations at the first and second locations and for forming a ratio of the first and second neutron population measurements; and
the means for deriving a neutron absorption function comprises means for measuring the macroscopic cross section of the formation for capture of thermal neutrons.

47. Apparatus for investigating a characteristic of an earth formation traversed by a borehole, comprising:
means for irradiating the formation with pulses of neutrons;
first and second detector means spaced at first and second locations from the irradiation means for generating signals representative of the magnitudes of at least the thermal neutron populations in the formation at said locations;
means responsive to the signals generated by at least one of the first and second detector means for deriving a function representative of a neutron absorption parameter of the formation;
means responsive during first and second measurement periods between neutron pulses to the signals generated by the first and second detector means, respectively, for deriving a function of the comparative magnitudes of the neutron populations in the formation at said first and second locations; and
means for combining the absorption function and the neutron populations function in accordance with a predetermined relationship for providing an output representative essentially of the formation porosity.

48. The apparatus of claim 47 wherein:
the means for deriving a function of the comparative neutron population magnitudes comprises means for measuring the magnitudes of the neutron populations at the first and second locations and for forming a ratio of the first and second neutron population measurements; and
the means for deriving a neutron absorption function comprises means for measuring the macroscopic cross section of the formation for capture of thermal neutrons.

49. A method for investigating a characteristic of an earth formation traversed by a borehole from detected indications of the neutron populations in a formation, comprising:
deriving first and second neutron population measurements from detected indications representative of the magnitudes of the neutron populations in the formation at first and second spaced-apart locations, respectively, along the borehole;
deriving a function from said first and second neutron population measurements which is representative of the comparative magnitudes of the respective neutron populations;
deriving a function representative of a neutron absorption parameter of the formation which is correlated in depth with said first and second neutron population measurement; and
combining the neutron populations function and the absorption function in accordance with a predetermined relationship for providing an output representative essentially of the formation porosity.

50. The method of claim 49 wherein:

the step of deriving a function of the comparative magnitudes of the first and second neutron population measurements comprises forming a ratio of said first and second measurements; and the step of deriving a function of a neutron absorption parameter comprises measuring the macroscopic cross section of the formation for capture of thermal neutrons.

51. A method for investigating a characteristic of an earth formation traversed by a borehole based upon successive detected indications of at least the thermal neutron populations in the formation at first and second locations spaced along the borehole following successive irradiations of the formation with pulses of neutrons, comprising:

deriving a function of the comparative magnitudes of the neutron populations in the formation at said first and second locations from neutron population indications detected at said locations during first and second measurement periods, respectively, between neutron pulses;

deriving a function of a neutron absorption parameter of the formation from the detected indications from at least one of said first and second locations; and combining the neutron populations function and the absorption function in accordance with a predetermined relationship for providing an output representative essentially of the formation porosity.

52. The method of claim 51 wherein:

the step of deriving a function of the comparative magnitudes of the first and second neutron population measurements comprises forming a ratio of said first and second measurements; and the step of deriving a function of a neutron absorption parameter comprises measuring the macroscopic cross section of the formation for capture of thermal neutrons.

* * * * *

UNITED STATES PATENT AND TRADEMARK OFFICE
CERTIFICATE OF CORRECTION

PATENT NO. : 3,971,935
DATED : July 27, 1976
INVENTOR(S) : William B. Nelligan

It is certified that error appears in the above-identified patent and that said Letters Patent are hereby corrected as shown below:

Col. 6, line 24, "relaed" should read --related--;
Col. 8, line 8, "to" should read --of--;
Col. 11, line 23, "h = 2.482" should read --h = -2.482--;
Col. 11, lines 24 and 25, "symbolo" should read --symbol o--;
Col. 11, line 46, "slainity" should read --salinity--;
Col. 12, line 10, "in memory" should read --in a memory--;
Col. 15, line 36, "at least the time" should read --at least the first time--;
Col. 16, line 6, "generatng" should read --generating--;
Col. 16, line 10, "signal" should read --signals--;
Col. 17, line 43, "neutron function" should read --neutron populations function--;
Col. 17, line 65, "diffeent" should read --different--;
Col. 18, line 34, "driving" should read --deriving--;
Col. 19, line 37, "fliuid" should read --fluid--;
Col. 20, line 50, "driving" should read --deriving--;
Col. 24, line 24, "the thermal" should read --the comparative magnitudes of the thermal--.

Signed and Sealed this

Fifteenth Day of February 1977

[SEAL]

Attest:

RUTH C. MASON
Attesting Officer

C. MARSHALL DANN
Commissioner of Patents and Trademarks